United States Patent [19]
Zedan

[11] Patent Number: 5,867,984
[45] Date of Patent: Feb. 9, 1999

[54] EXHAUST GAS EXTRACTION SYSTEM FOR AN INTERNAL COMBUSTION ENGINE

[76] Inventor: Khaled H. Zedan, 5405 Chicago Ave. #1507, Lubbock, Tex. 79414

[21] Appl. No.: 769,375

[22] Filed: Dec. 19, 1996

Related U.S. Application Data

[60] Provisional application No. 60/008,845, Dec. 19, 1995.
[51] Int. Cl.⁶ .................................................. F02B 35/00
[52] U.S. Cl. ................................................. 60/315; 60/317
[58] Field of Search ........................... 60/315, 317, 319; 123/65 V, 65 VA

[56] References Cited

U.S. PATENT DOCUMENTS

| | | |
|---|---|---|
| 1,301,036 | 4/1919 | Cage . |
| 1,603,957 | 10/1926 | Kasley . |
| 2,055,026 | 9/1936 | Cook ........................................... 60/315 |
| 2,131,957 | 10/1938 | Kadenacy . |
| 2,211,936 | 8/1940 | Radelet ....................................... 60/315 |
| 2,402,087 | 6/1946 | Rosales ....................................... 60/315 |
| 2,544,605 | 3/1951 | Mallory ....................................... 60/317 |
| 2,581,668 | 1/1952 | Kadenacy . |
| 2,888,800 | 6/1959 | Densham . |
| 3,106,821 | 10/1963 | Ridgway . |
| 3,726,092 | 4/1973 | Raczuk . |
| 4,920,745 | 5/1990 | Gilbert . |
| 5,161,372 | 11/1992 | Whipple . |
| 5,542,249 | 8/1996 | Heath ......................................... 60/315 |

*Primary Examiner*—Thomas E. Denion
*Attorney, Agent, or Firm*—Royston Rayzor Vickery Novak and Druce

[57] ABSTRACT

A method for potentiating the performance of an internal combustion engine. The method includes the steps of providing an exhaust extraction booster at a piston chamber of an internal combustion engine for evacuating exhaust product from the piston chamber through an exhaust exit. The piston chamber is defined within a piston cylinder having a piston head reciprocating therein. A fuel mixture is ignited within the piston chamber so that the fuel mixture burns at least partially and produces a heated exhaust product within the piston chamber. The extraction booster is placed in fluid communication with the piston chamber for drawing the exhaust product from the piston chamber toward and across the booster. An exhaust dilution inlet is also provided between the piston chamber and the booster for permitting cooling fluid to dilute the heated exhaust product before the exhaust product reaches the booster thereby preventing fully heated exhaust product from being processed by the booster.

12 Claims, 1 Drawing Sheet

EXHAUST GAS EXTRACTION SYSTEM FOR AN INTERNAL COMBUSTION ENGINE

This application claims the benefit under 35 U.S.C. 119(e) of U.S. Provisional Application Ser. No. 60/008,845 filed Dec. 19,1995.

FIELD OF THE INVENTION

This invention relates generally to internal combustion engines and enhancements thereto. More specifically, it relates to accessories that may be incorporated into a conventionally designed combustion engine that boosts the evacuation of exhaust product from an engine's piston chamber(s) and potentiates the evacuation system's performance when incorporated downstream from the extreme heat containing exhaust product.

BACKGROUND OF THE INVENTION

Internal combustion engines and the principles of their operation are well known. As a basic to all, a fuel mixture typically consisting of a combustible fuel such as gasoline or diesel is combined with a facilitating mixture of oxygen containing gas, most often air. It is possible that the air which is mixed with the combustible fuel be conditioned in one or more of several ways. Turbochargers are well known devices that can be added to combustion engines to potentiate their power development. Typically, a turbocharger will divert a portion of the exhaust gases from a running engine to be used for combining with the fuel source for injection into the piston cylinder(s). This achieves two benefits: the first is a pressuring of the fuel and gas mixture into the piston chamber and the second is a preheating of the mixture so that it is more readily ignited and thoroughly combusts. Because of the principles of the combustion engine, its efficiency is potentiated by those things that facilitate the input of fuel and air mixture, and also by those things that facilitate the removal of the spent exhaust products after ignition. For these reasons devices that can be incorporated into the original design of the piston-cylinder combination in an internal combustion engine will beneficially enhance the engine's performance. It is also possible that such facilitating features may be added subsequent to the original manufacture as retro-fit enhancements. The present invention has been developed to speak to these needs for enhancement and provide the same for an internal combustion engine.

DESCRIPTION OF THE DRAWING

FIG. 1 is a cross-sectional view of one embodiment of the present invention with variable and possible positions of the

DESCRIPTION OF THE INVENTION

Figure 1:
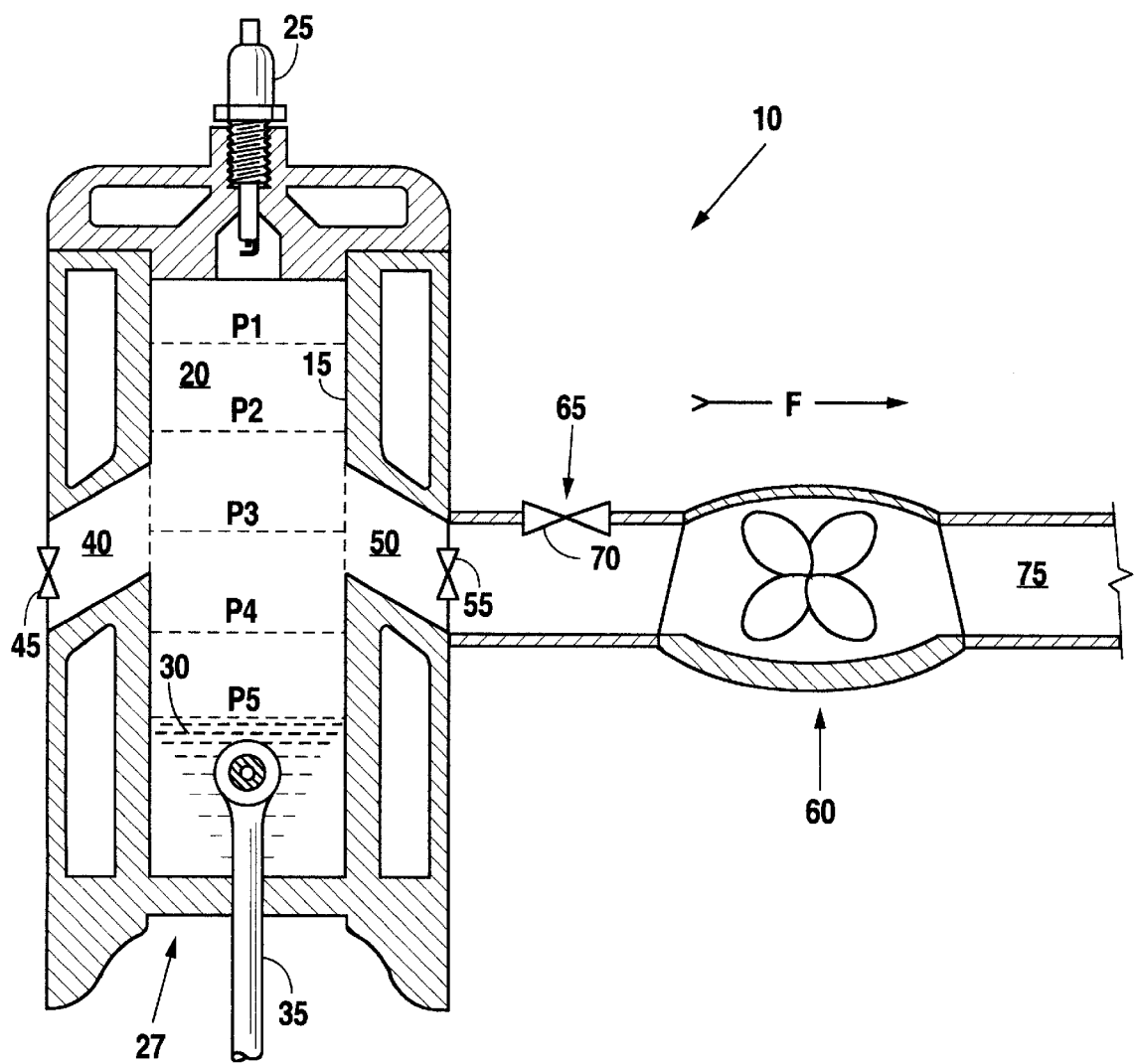

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

Certain terminology will be used in the following description for convenience and reference only and not for purposes of limitation. For example, the words "rightwardly", "leftwardly", "upwardly" and "downwardly" will refer to directions in the drawings to which reference is made. The words "inwardly" and "outwardly" refer to directions toward and away from, respectively, the geometric center of the structure being referred to. This terminology includes these words, specifically mentioned derivatives thereof, and words of similar import.

Furthermore, elements may be recited as being "coupled"; this terminology's use anticipates elements being connected together in such a way that there may be other components interstitially located between the specified elements, and that the elements may be connected in fixed or movable relation one to the other. Still further, those elements so described my be permanently connected together or releasably connected together.

Certain components may be described as being adjacent to one another. In these instances, it is expected that such a relationship so described shall be interpreted to mean that the components are located proximate to one another, but not necessarily in contact with each other. Normally there will be an absence of other components positioned therebetween, but this is not a requirement. Still further, some structural relationships or orientations may be designated with the word "substantially". In those cases, it is meant that the relationship or orientation is as described, with allowances for variations that do not effect the cooperation of the so described component or components.

The present invention comprises a system designed to improve the performance of a combustion engine. More specifically, it is an exhaust gas extraction system 10 that can be incorporated into an internal combustion engine at the time of manufacture or subsequently as a retro-fit feature. In principal, the invention provides a boost or booster 60 for assisting the evacuation of exhaust from a piston chamber 20 established within a piston cylinder 15.

In one embodiment, the boost comprises an exhaust evacuation booster 60 that in a preferred embodiment is a bladed fan. The evacuation fan 60 is placed into fluid communication with an exhaust exit 50 of the chamber 20. The degree to which exhaust is permitted to flow from the chamber 20 across the exhaust exit 50 toward the booster fan 60 is governed by an exhaust exit controller 55. In an exemplary embodiment, the exhaust exit controller 55 takes the form of a variable exit valve that can be variably oriented into many different positions between open and closed configurations.

Because of the extreme heat conditions that typically accompany exiting exhaust, the booster fan 60 must be appropriately designed and manufactured to withstand the heat and also perform under these conditions. In order to temper or dampen these extreme heat conditions, an exhaust dilution inlet 65 is provided downstream from the exhaust exit control valve 55, but upstream from the booster fan 60. The dilution inlet 65 is governed by a dilution inlet controller 70. In the illustrated embodiment, the dilution inlet controller 70 is an air control valve capable of regulating the amount of dilution air permitted to enter the exhaust flow stream. Much like the exit valve 55, the dilution valve 70 is operable between open and closed positions and is orientable between these extreme positions.

In a preferred embodiment, the dilution air that is permitted to enter the exhaust gas stream is ambient air having a significantly lower temperature than the exhaust gas; therefore, when the two are mixed, the overall temperature lessens and the extreme heat conditions imposed upon the booster fan 60 are reduced.

As is common to all internal combustion engines, a fuel inlet 40 is provided into the piston chamber 20. Through this inlet 40, a typical mixture of combustible fuel such as gasoline enters the piston chamber as a mixture with air that enables combustion. Like the exit valve 55 and dilution valve 70, the fuel inlet is controlled by a fuel inlet valve 45. Also common to conventional internal combustion engines, each piston cylinder 15 accommodates a reciprocating piston 27 that travels backward and forward in a reciprocating fashion. The piston 27 includes a piston head 30 connected to a driving piston rod 35. The piston head 30 is configured and sized to conform to the interior shape of the piston cylinder 15 by sizing each so that a close tolerance between the piston head 30 and cylinder 15 is achieved. A marginal clearance is provided therebetween that accommodates the reciprocating motion but resists the passage of both the fuel mixture and resulting exhaust product. As is also common to internal combustion engines, an ignition source 25 is provided commonly in the form of a spark plug that ignites the compressed fuel mixture thereby moving the piston 27 within the cylinder and generating the desired work from the engine. As may be appreciated in FIG. 1, a general flow direction (F) in the system is indicated from left to right with the spent exhaust products ultimately leaving the system through an exhaust outlet 75.

The present invention does not alter the conventional operation of a combustion engine's piston-cylinder configuration. As may be appreciated in FIG. 1, a power stroke is illustrated through a progression of the piston head 30 through the continuous positions between an initial starting position indicated as (P1) and progressing downward through a lowermost position indicated as (P5). At the lowermost position, (P5), which is where the piston head 30 is shown in FIG. 1, the variable chamber 20 is at its greatest volume. From that lowermost position, the piston 27 travels upwardly compressing the fuel mixture that has been trapped within the chamber 20.

The enclosing characteristics of the chamber 20 is accomplished by closing the fuel inlet valve 45 after a fuel mixture has been injected into the piston cylinder 15 so that the chamber 20 is substantially occupied by the same. The exhaust valve 55 is also closed thereby establishing the confining chamber 20. Subsequently, the piston head 30 is urged upwardly under the driving force of the piston rod 35. The piston head 30 rises up in a sliding fashion from the lowermost position (P5) to the uppermost position (P1). In the upper position (P1), the ignitable fuel mixture is compressed into the relatively small volume adjacent to a spark cavity wherein the igniting spark plug 25 is located.

To initiate a downward power stroke, the spark plug 25 generates an igniting spark that causes an explosion-type rapid burn of the fuel mixture. As the fuel burns, the resulting products volumetrically expand from that of the unignited fuel mixture and drive the piston head 30 downward. It is this force captured by the piston-cylinder combination that converts the energy contained in the fuel mixture to mechanical work for use. After the force of the ignited fuel has been exploited, the piston 27 continues its downward motion toward the lowermost position (P5).

During the power stroke, expansive pressure is exerted upon the piston head 30 over a relatively short travel distance within the piston cylinder 15. Referring to FIG. 1, that power stroke will be developed across a range of motion originating at (P1) and progressing to at least (P2), and possibly therebeyond, but typically not up to or beyond (P3). At the intermediate position (P3), the closed chamber will normally be opened at the exhaust exit valve 55 permitting the spent products of the fuel mixture to exit from the chamber 20 through the exhaust exit 50.

The present invention's inclusion of the booster fan 60 assists the evacuation of the spent exhaust products from the chamber 20. By applying the vacuum created by the fan 60, a more complete evacuation of the exhaust products is assured. At the same time, a lowered pressure is developed within the chamber 20 that at a subsequent step tends to suck the fuel mixture into the chamber 20 thereby readying the piston-cylinder combination for the next upward compression stroke.

During the initiation of the evacuation process by the booster fan 60, the exhaust dilution inlet 65 may be opened by appropriately configuring the dilution valve 70. By opening this valve 70, cooler fluid, normally ambient air, is permitted to mix with the exiting exhaust product so that when the resulting mixture reaches the booster fan 60 it is substantially cooler than upon immediate exit from the chamber 20. It is only necessary that the dilution valve 70 be opened for a relatively short time period during which exhaust products, which are typically heated gases, are actually being drawn from the chamber 20 and across the booster fan 60. At other times, the inlet air valve 70 may be closed and the booster fan 60 permitted to develop a vacuum on its upstream side toward the piston chamber 20.

As the piston 27 continues to move downward from the intermediate position (P3), the dilution valve 70 will be closed thereby permitting the vacuum developed by the booster fan 60 to be communicated across the exhaust exit 50 and applied to the piston chamber 20. This suction and vacuum may be continued until the piston head 30 reaches its lowermost position (P5). At this time, the variable interior volume of the chamber 20 will be at its greatest and optimum vacuum may be applied by the booster fan 60 at that time. The vacuum or lower pressure condition may be captured in the chamber 20 by closing the exhaust exit valve 50 while the vacuum is applied thereto.

After the closing of the exhaust valve 55, the fuel inlet 40 may be opened by appropriately configuring the inlet valve 45 to an open position. In this manner, the vacuum that has been established within a chamber 20 may be exerted upon the fuel inlet 40 to pull the needed fuel mixture into the chamber 20 in preparation for the next upward compression stroke of the piston head 30. After the chamber 20 has been sufficiently filled with the fuel mixture, the inlet valve 45 may be closed thereby once again establishing the closed chamber 20 within the piston cylinder 15.

This cyclical procedure is repeated rapidly thereby resulting in the "running" of the internal combustion engine when a plurality of pistons act in cooperation with one another. During this operation, the booster fan 60 may continuously run and its effect upon the piston chamber 20 will be governed by operation of the exhaust exit valve 55 and dilution valve 70. It is also possible that the operation of the fan 60 be discontinued during times when its affects are not required. Still further, a single booster 60 may be utilized and applied to a plurality of cylinders; or alternatively, individual boosters 60 may be provided, one each of a plurality of cylinders 15.

The specific construction and nature of the booster 60 is not critical. What is critical is its suction capabilities that serve to evacuate the exhaust products from the piston chamber 20 after a power stroke. Similarly, the specific nature of the several valves is also not considered to be critical. Each valve may be of suitable construction to accommodate its inclusion in the internal combustion engine environment within which it is incorporated.

It is also contemplated that the exhaust dilution inlet valve 70 may be open at all times except when a maximum vacuum pressure is desired to be developed within the piston chamber. In this manner, the cooling effect of the ambient air that is permitted to mix with heated exhaust gases will be potentiated. Still further, cooling ambient air may continue to be drawn across the booster fan 60 after the exhaust gas has passed thereby further cooling the fan 60. In this manner, the fan 60 can be further cooled and operated at lower temperatures than which is achieved by the mixture of the dilution air with the exhaust product. It is in this manner that the present invention is incorporated upon an internal combustion engine for potentiating its performance. Not only is a boost or assist provided to the piston cylinder 15 for evacuating exhaust product therefrom, but heated conditions resulting in these exhaust products are buffered and reduced by adding diluting fluid thereto prior to the mixed products being processed by the booster 60. In this manner, the performance of the booster 60 may be enhanced as well as its operational life extended.

What is claimed and desired to be secured by Letters Patent is as follows:

1. A method for potentiating the performance of an internal combustion engine, said method comprising the steps of:

providing an exhaust extraction booster at a piston chamber of an internal combustion engine for evacuating exhaust product from said piston chamber through an exhaust exit, said piston chamber being defined within a piston cylinder and having a piston head reciprocating therein;

igniting a fuel mixture within said piston chamber so that said fuel mixture burns at least partially thereby producing a heated exhaust product within said piston chamber;

placing said extraction booster in fluid communication with said piston chamber for drawing said exhaust product from said piston chamber toward and across said booster; and providing an exhaust dilution inlet between said piston chamber and said booster for permitting cooling fluid to dilute said exhaust product before said exhaust product reaches said booster thereby preventing fully heated exhaust product from being processed by said booster.

2. The method for potentiating the performance of an internal combustion engine as recited in claim 1, said method further comprising:

positioning an exhaust exit controller at said exhaust exit for restricting fluid communication between said piston chamber and said booster.

3. The method for potentiating the performance of an internal combustion engine as recited in claim 2, exhaust exit controller comprising an openable and closeable valve.

4. The method for potentiating the performance of an internal combustion engine as recited in claim 3, said exhaust exit valve being continuously positionable between said openable and closeable positions for permitting variable amounts of dilution fluid to mix with said exhaust products.

5. The method for potentiating the performance of an internal combustion engine as recited in claim 1, said booster being a bladed fan.

6. The method for potentiating the performance of an internal combustion engine as recited in claim 1, said booster being a gas pump.

7. The method for potentiating the performance of an internal combustion engine as recited in claim 2, said method further comprising:

positioning an exhaust dilution controller at said dilution inlet for restricting fluid passage through said dilution inlet.

8. The method for potentiating the performance of an internal combustion engine as recited in claim 2, said method further comprising:

introducing said fuel mixture into said piston chamber through a fuel inlet; and positioning a fuel inlet controller at said fuel inlet for restricting fluid passage through said fuel inlet.

9. The method for potentiating the performance of an internal combustion engine as recited in claim 8, said method further comprising:

closing said fuel inlet and reciprocating said piston head within said piston cylinder so that an interior volume of said piston chamber is reduced thereby compressing said fuel mixture;

establishing a power stroke by driving said piston in said piston cylinder under the influence of the expansion forces caused by the ignition and burning of the fuel mixture;

opening a closed exhaust exit controller so that the burned fuel mixture in the form of heated exhaust may exit said piston chamber;

pulling a vacuum on said piston chamber with said booster by drawing said exhaust from said piston chamber; and diluting the heated exhaust with cooler gas before said exhaust reaches said booster.

10. The method for potentiating the performance of an internal combustion engine as recited in claim 9, said method further comprising:

closing said exhaust exit controller thereby trapping a reduced pressure vacuum within said piston chamber.

11. The method for potentiating the performance of an internal combustion engine as recited in claim 10, said method further comprising:

closing said exhaust dilution inlet controller prior to closing said exhaust exit controller thereby increasing the vacuum pulled by said booster within said piston chamber.

12. The method for potentiating the performance of an internal combustion engine as recited in claim 11, said method further comprising:

opening said fuel inlet controller and sucking fuel mixture into said piston chamber under the influence of the trapped vacuum within said piston chamber.

* * * * *